US005390578A

United States Patent [19]

Raymer

[11] Patent Number: 5,390,578

[45] Date of Patent: Feb. 21, 1995

[54] GUITAR WITH ROTATING - COLLAPSIBLE NECK PORTION

[76] Inventor: Thomas G. Raymer, 4317 68th Street Ct. NW., Gig Harbor, Wash. 98335

[21] Appl. No.: 263,062

[22] Filed: Jun. 21, 1994

[51] Int. Cl.[6] .................. G01D 3/00

[52] U.S. Cl. .................. 84/291; 84/267; 84/293

[58] Field of Search .................. 84/267, 275, 291, 293

[56] References Cited

U.S. PATENT DOCUMENTS

| | | | |
|---|---|---|---|
| 4,073,211 | 2/1978 | Jorgensen | 84/267 |
| 4,111,093 | 4/1977 | Field et al. | 84/267 |
| 4,191,085 | 3/1980 | Litwin | 84/293 |
| 4,377,962 | 3/1983 | Parker | 84/269 |
| 4,686,882 | 8/1987 | Shaw | 84/291 |
| 4,770,079 | 9/1988 | Mastroianni | 84/291 |

*Primary Examiner*—Michael L. Gellner
*Assistant Examiner*—Patrick J. Stanzione

[57] ABSTRACT

A guitar, having a unique neck mounting system combined with a quick release lever allowing for rapid neck transformations from a normal playing position to a fully stowed position, when rotated on a plane parallel to main body surface, and placed within a shaped body recess in upper surface of main body. Neck to body joint having a pivotal hole through which a bolt is anchored at neck mounting base. Opposite end of bolt being attached, by a swiveling connection, to a quick release lever that when rotated provides a compressive force to neck body joint, or conversely allows joint to relax for purpose of rotating neck into body recess.

3 Claims, 3 Drawing Sheets

GUITAR WITH ROTATING - COLLAPSIBLE NECK PORTION

BACKGROUND—FIELD OF INVENTION

This invention relates to the area of collapsible portable instruments, specifically a guitar employing a convenient release mechanism which permits neck rotation about an axis point and stowage within a unique body recess.

BACKGROUND—DESCRIPTION OF PRIOR ART

Musicians have long sought to travel with their instrument for moments of inspiration and practice. However, the required length of a guitar case has always made it impractical for use as carry-on luggage. Therefore, it is the specific goal of this invention to provide an ultra compact unit which is fully compatible with all forms of modern transportation and is closer than previous approaches to achieving the appearance and sound quality of a standard fixed neck guitar.

Patents have been granted in the past for folding or collapsible instruments. However, previous designs have foregone the essential requirement for a secure and steadfast bond between guitar body and neck. This necessity must be achieved in order to maintain perfect string, alignment and tension while the neck is held firmly in the critical playing position. In addition, previous patents lacked convenient means for rapid transformation between a playable and travel form.

Following is a study of prior an disadvantages.

(a) U.S. Pat. Nos. 4,073,211 to Jorgensen and 4,111,093 to Field-Kaiser, both disclose a movable neck that folds downward, perpendicular to the body, stowing into the instrument's body back. As a result of the plane of motion and the available surface area, the selection of hinge hardware is limited to smaller diameter, less stable fittings which are styled after common piano hinges. Due to the long lever arm created by the neck, the high tensions created and the fact that the stress would be concentrated in one small area, this type of hinge arrangement can not provide the required stability for a quality instrument. In addition, the hinge tolerances involved would be critical to achieving superior neck stability and very difficult to maintain given the constant friction and wear created by repeated cycles of neck rotation.

Another problem exists when the neck is designed to fold downward, perpendicular to the body's main surface. String tension will increase to the point of breakage if relief is not given. To alleviate this problem, U.S. Pat. No. 4,073,211 requires the use of a secondary bridge mount during stowage to hold the strings in a forward position to account for increased travel length around the body back. The extra bridge mount adds cost and increases the time required for neck transformation as the user must relocate the bridge each time during the breakdown cycle. U.S. Pat. No. 4,111,093 dealt with this problem by developing a costly network of gear tracks and rotors to move the entire string assembly forward as the neck is folded under the body. Both designs incur needless manufacturing costs and do not promote the most efficient method of stowing an instrumental neck.

(b) U.S. Pat. No. 4,191,085 to Litwin is one example of an instrument break-down that burdens the user with the complete removal of the guitar's neck. This procedure would require excessive time and patience as the instrument must be broken into 3 separate parts and the neck inserted into the body receptacle.

(c) U.S. Pat. No. 4,686,882 to Shaw suffers from extensive complexity created by expanding body parts requiring intricate hardware, gear drives and connecting rods required for operation. Not only would this increase production costs, but it would also decrease the possibility of capturing the smooth feel and appearance of a standard modern guitar.

(d) In addition to the disadvantages described above, these designs all require that special tools be transported with the instrument for use during each transformation. This requirement will add weight to the overall package and will not be as convenient as the self contained system used in the proposed invention.

OBJECTS AND ADVANTAGES

Accordingly, several objects and advantages of the present invention are:

a) to provide an instrument whose design allows for convenient and extremely rapid transformations between a compact travel form, and a tuned playable form.

b) to provide an instrument which benefits from the ridged stability created by a neck-body mount which presents an identical surface area arrangement to that of a standard electric guitar which is fitted with a screw-on neck.

c) to provide an instrument that eliminates the need for any tools during neck transformations.

d) to provide an instrument which negates the problem of string interference during neck storage.

e) to provide a collapsible instrument, while not restricting it's aesthetic value or superior playing characteristics.

f) to provide an instrument capable of withstanding repeated cycles of neck transformation while retaining hardware integrity and neck stability.

DRAWING FIGURES

Closely related figures have the same number but different alphabetic suffixes.

Figure 3:
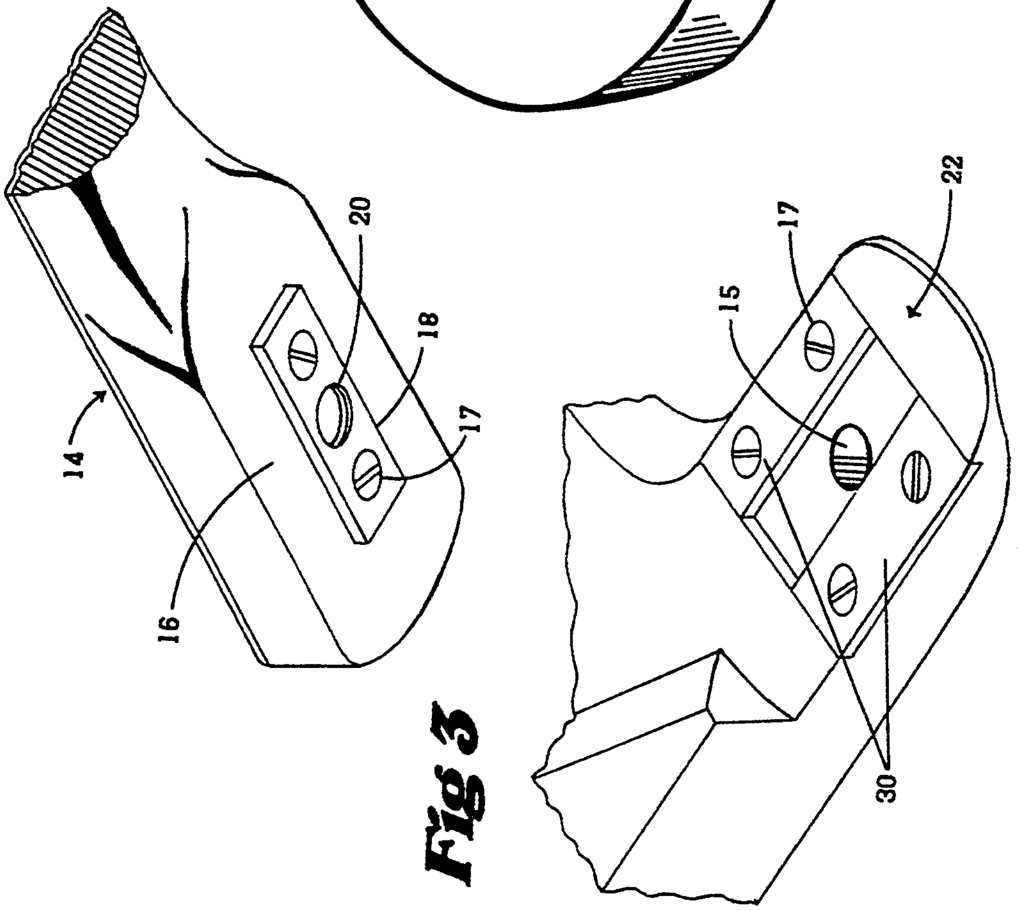

FIG. 3 presents an expanded perspective view of the neck mounting system and its associated brackets.

Figures 4, 5:
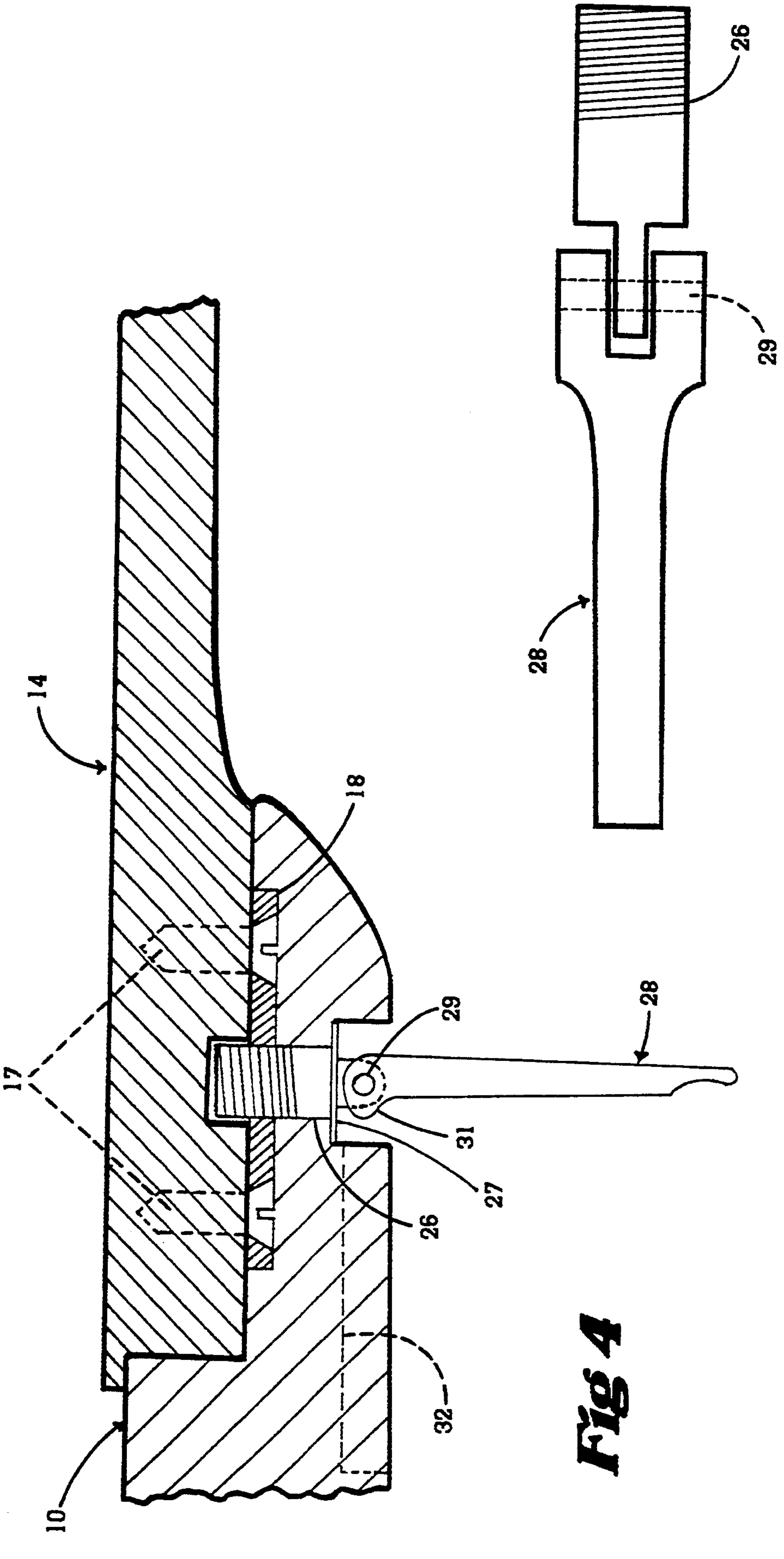

FIG. 4 shows a detailed side view of the neck mount area, including the male bracket, its connection to the neck and its relationship to the neck bolt/quick release lever combination.

FIG. 5 details an expanded end view of the neck bolt/quick release lever combination, and the press fit attachment pin used to connect the two parts.

REFERENCE NUMERALS IN DRAWINGS

10 Main Body
12 Body Recess Area
14 Headless Neck
15 Neck Axis Point
16 Neck Mounting Base
17 Mounting Screws
18 Male Stabilizing Bracket
20 Threaded Bolt Hole 22 Neck Mount Surface Area
24 Neck Bolt Hole
26 Neck Bolt
27 High grade Steel Washer
28 Quick Release Lever
29 Press Fit Attachment Pin
30 Female Stabilizing Brackets
31 Cam with Increasing Radius
32 Elongated Body Recess

DESCRIPTION—FIGS. 1A TO 5

Figure 1B:
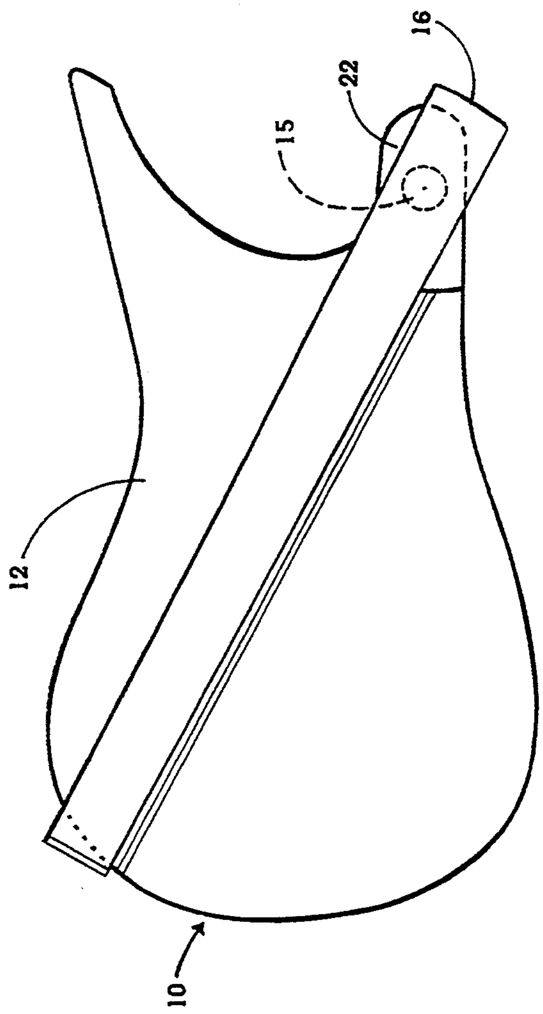
FIGS. 1A and 1B depict the two fixed states of neck position, the open and locked or playable position, and the fully stowed or collapsed position.
Figure 1A:
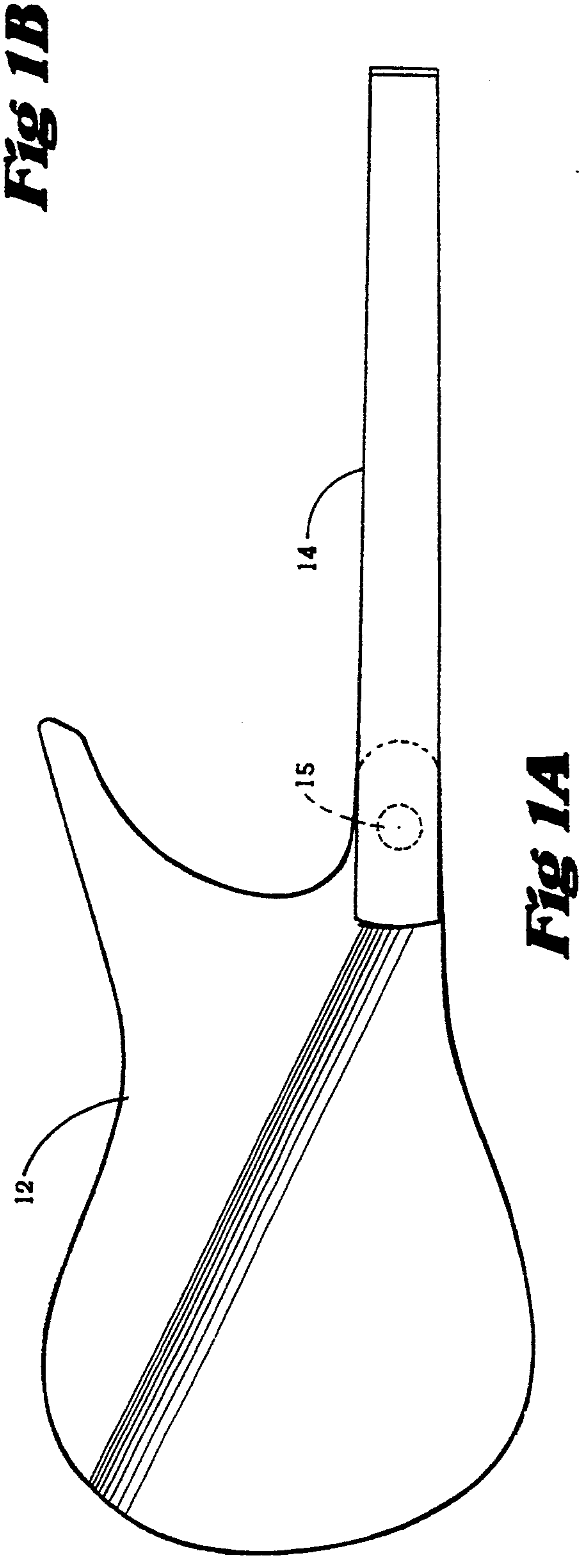

A typical embodiment of the current invention is shown in FIGS. 1A and 1B. A main body section 10 is very similar to that of a standard electric guitar; however, a special body recess area 12 has been formed to provide adequate clearance as the neck is rotated to the stowed position. Main body 10 thickness is approximately 2 inches, while body recess area 12 measures approximately 1¼ inches thick. The collapsible neck in FIG. 1A is depicted in the fully extended or playable position. In FIG. 1B the neck has been released at its mount and rotated counter clockwise about a neck axis point 15 and into the body recess area 12. Some basic components such as strings, knobs, bridge and electric pickups have been omitted to reduce drawing clutter. The components to be utilized are industry standard parts and not considered crucial to the explanation of my invention. The instrument's neck 14 is mounted to the body 10 at the lowest point to 1) insure the longest possible distance diagonally across the body face, creating maximum neck containment within the perimeter of the instrument's body, and 2) to provide proper clearance for the end of a neck base 16 as it rotates and extends beyond the body perimeter during stowage. A headless neck configuration 14 provides an acceptable neck length and allows maximum stowage in the available body perimeter as the neck 14 is rotated counter clockwise into the body recess 12.

Figure 2:
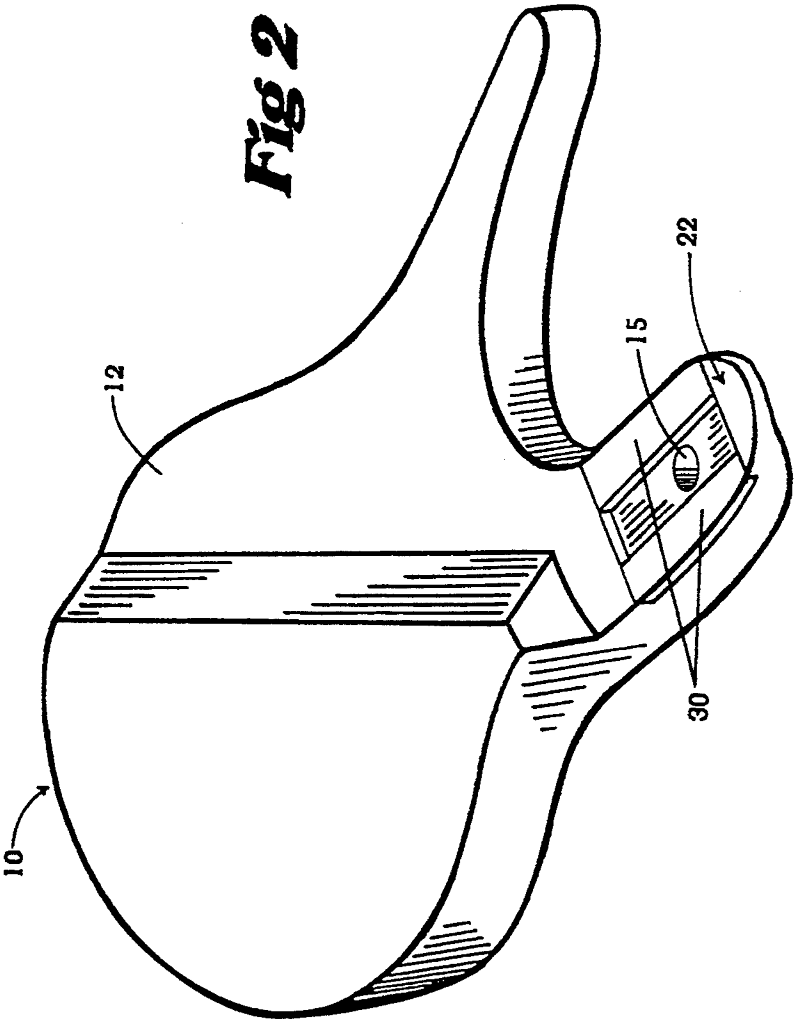
FIG. 2 shows a perspective view of the main body with a general view of the neck mount surface area.

A perspective view is shown in FIG. 2 of the main body section 10. The neck mount surface area 22 is formed to be flush and parallel to the surface of the body recess area 12 and provides a solid housing for the female stabilizing brackets 30 and a stable platform to accommodate the neck mounting base 16.

When in the fully extended or playable position (FIG. 1A), the neck 14 is firmly locked in position by a metal bracket system 18 & 30. In FIG. 3 the upper surface of the female stabilizing brackets 30 are mounted flush to the neck mount surface area 22 by four wood screws 17 and between them lies a shallow recess area approximately ¼ inch deep. The inner edge of each female bracket 30 is beveled to eliminate binding when the neck 14 is loosened for stowage. The male stabilizing bracket 18 is beveled to match the female's angled edge and serves two functions, 1) to eliminate all neck rotation whenever it is fitted within the female stabilizing brackets 30, and 2) to accommodate a machine threaded hole which receives the neck bolt 26 (FIG. 4 & FIG. 5).

In FIG. 4 the quick release lever 28, and its associated cam 31 with an increasing radius, are the key to minimum time elapse during neck transformation. A press fit attachment pin 29 provides a swiveling connection between the quick release lever 28 and the neck bolt 26. An elongated body recess 32 is provided to accommodate the quick release lever 28 as the neck 14 is placed in a fully extended position and the quick release lever 28 is pressed flush into the elongated body recess 32.

From the descriptions above, a number of advantages of my collapsible guitar become more clearly evident:

(a) The instrument can be broken down very quickly and the requirement for tools to be carried with the unit is completely eliminated due to the built in quick release lever and the unique bracket system.

(b) Although collapsible, this instrument still provides neck rigidity characteristics comparable to that found in fixed neck guitars of high quality. This is due to the fact that the neck mounting surface provides a large stable platform as the mating surface area for the neck mounting base. This combined with the tightly mated bracket system described above, and the firm pressure applied by the quick release lever, creates a joint fully capable of handling the string tensions involved.

(c) Even in its compact travel form, this instrument is maintained as a single integral unit. The neck does not require complete removal, but only loosened enough to allow the internal brackets to clear, thus allowing free neck rotation into the stowed position, while maintaining an integral unit as its placed into a suitable carrying case.

Operation—FIGS. 1A, 1B, 3, 4 & 5

The ultimate goal of this invention is to provide an instrument that is both practical and convenient. Following is a detailed explanation of the typical procedures used to accomplish unit breakdown and set up.

Instrument breakdown for travel:

Beginning with the neck 14 in the fully extended and locked position, the quick release lever 28 must be pulled out of the elongated body recess 32 to a position, perpendicular to the body surface. This step causes the tension on the neck bolt 26 to relax and a small gap to be created between a cam with increasing radius 31, at the rounded end of the quick release lever 28, and the washer 27 mounted on the body at the neck bolt hole 24. To increase the gap sufficiently for the male and female brackets 18 & 30 to clear each other, the quick release lever 28 will be rotated counter clockwise 2 to 3 turns, to cause the threaded neck bolt 26 to back out slightly from the male stabilizing bracket 18. This step will also allow the quick release lever 28 to be stowed nearly into the elongated body recess 32 after neck rotation.

Next, by gripping the perimeter of the neck mounting base 16 and applying upward pressure, the neck 14 will rise approximately ¼ inch allowing the top of the female stabilizing brackets 30 to clear the bottom of the male stabilizing bracket 18. As a result, the neck 14 can be easily rotated counter clockwise about the neck axis point 15 and stowed neatly into the body recess area 12. The guitar strings present no particular problem during this procedure, as the distance between the string anchor points is decreased as the neck begins its rotation, allowing the string tension to fully relax.

Instrument setup for use:

The initial step is to rotate the neck 14 clockwise to the fully extended position in FIG. 1A. This will align the male and female brackets 18 & 30 in a parallel fashion and create a firm interlock as the neck mounting base 16 is lowered into the neck mount surface area 22.

Next, the quick release lever 28 is moved perpendicular to the main body 10 and given 2 to 3 clockwise turns to reset the proper spacing between the washer 27 and the cam 31. The quick release lever 28 is then rotated flush into the elongated body recess 32. Due to the increasing radius of the cam 31, a tightening force is applied to the neck bolt 26 which firmly bonds the neck 14 to the neck mount surface area 22. The exact force can be adjusted by varying the number of clockwise turns applied to the quick release lever 28 during the step above.

After a quick fine tuning of the strings, the instrument is ready to play!

SUMMARY, RAMIFICATIONS AND SCOPE

Accordingly, the reader will see that this instrument has been carefully designed to be as simple, efficient and practical as possible. The combination of a quick release lever, an ultra compact size, and the achievement of superior neck stability, creates an overall instrument package that is superior to any collapsible guitar available today.

Although the descriptions above contain many specificity's, these should not be construed as limiting the scope of the invention, but merely providing illustrations of presently preferred embodiments. For example, the descriptions above depict a solid body electric guitar. However, with some minor modifications this approach will be effectively applied to hollow-bodied acoustic guitars as well.

Thus the scope of the invention should be determined by the appended claims and their legal equivalent, rather than by the examples given.

What I claim is:

1. A collapsible stringed instrument comprised of an elongated body having a neck mount surface area at one end and a flat main body area at the opposite end, and having a playing face and an opposite back face and said playing face having a recessed area of sufficient dimension to allow an instrument neck with pivotal means at its mounting base, unobstructed rotation on a parallel plane in relation to main surfaces of said body, from an open position fully extended beyond perimeter of said body, to a stowed position substantially within perimeter of said body and juxtaposed to angled edge of said recess, and said neck having a neck mounting base at one end and a string anchoring portion at the opposite end, said neck mounting base and said neck mount surface area each being appropriately adapted to mate as a coupling unit, and each having a hole centered at a neck axis point common to approximate center of said neck mounting base and said neck mount surface area, enabling free rotation of said neck when said coupling unit is not engaged, and motion of said neck being completely eliminated when said coupling unit is tightly mated.

2. The collapsible instrument of claim 1, wherein said coupling unit is comprised of a flat, elongated female bracket system having attachment means for flush mounting at said neck mount surface area, and a flat elongated male bracket having attachment means for mounting at said neck mounting base, and said male bracket having sufficient dimensions to tightly mate between said female bracket system when said neck mounting base is closely fitted to said neck mount surface area, and having a threaded hole centered upon said male bracket, and said hole being aligned with said axis point for insertion of a properly sized threaded rod for purpose of compressing said coupling unit.

3. The collapsible instrument of claim 1, further including an elongated quick release lever having a handle at one end, suitable for manipulation by human fingers, and swiveling means for connection at opposite end for purpose of attachment to properly adapted end of said threaded rod, and said threaded rod being positioned through said axis point and anchored at said threaded hole, and swiveling end of said quick release lever having compressive means to apply force to said coupling unit as said quick release lever is actuated from a position perpendicular to said opposite back face to a position parallel to said opposite back face, whereby simple manipulation of said quick release lever will cause said coupling unit to be firmly joined when said quick release lever is placed parallel to said opposite back face, and said coupling unit to separate a sufficient distance when said lever is positioned perpendicular to said opposite back face, thereby providing adequate clearance between said male and female brackets to allow said neck to rotate into said recess.

* * * * *